United States Patent
Sato

(10) Patent No.: US 7,340,959 B2
(45) Date of Patent: Mar. 11, 2008

(54) PRESSURE SENSOR

(75) Inventor: Junichi Sato, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 11/523,033

(22) Filed: Sep. 19, 2006

(65) Prior Publication Data
US 2007/0095145 A1 May 3, 2007

(30) Foreign Application Priority Data
Oct. 31, 2005 (JP) .............................. 2005-316415

(51) Int. Cl.
*G01L 9/16* (2006.01)
(52) U.S. Cl. .......................... 73/730; 73/754
(58) Field of Classification Search .................. 73/730, 73/754
See application file for complete search history.

(56) References Cited
U.S. PATENT DOCUMENTS
5,595,939 A    1/1997 Otake et al.
7,268,008 B2 *  9/2007 Tomisaka et al. .............. 438/48
2005/0132813 A1 * 6/2005 Aratani et al. ................. 73/715
2005/0193825 A1 * 9/2005 Otsuka ......................... 73/715
2006/0075821 A1 * 4/2006 Otsuka et al. ................. 73/715
2006/0107750 A1 * 5/2006 Tanaka et al. ................. 73/754

FOREIGN PATENT DOCUMENTS
JP    A-07-209115    8/1995

* cited by examiner

*Primary Examiner*—Andre J. Allen
(74) *Attorney, Agent, or Firm*—Posz Law Group, PLC

(57) ABSTRACT

A pressure sensor includes a casing formed with a first case and a second case that has a pressure introduction hole for introducing a measurement object, a pressure sensing portion in the casing and a metal diaphragm disposed between an end face of the first case and a reception face of the second case. The measurement object is introduced into a subspace that is formed as an expanded end of the pressure introduction hole in the second case for measurement of pressure by transmitting the pressure through the diaphragm to the pressure sensing portion, and the pressure sensing hole has an orifice that reduces a cross-sectional area of the pressure sensing hole.

7 Claims, 5 Drawing Sheets

EVENLY APPLIED PRESSURE

UNEVENNESS

CAUSED BY DELAY OF PRESSURE TRANSMISSION

UNEVENNESS

CAUSED BY DIFFERENCE IN COMPRESSIBILITY

250
PRESSURE SENSOR

CROSS REFERENCE TO RELATED APPLICATION

This application is based on and claims the benefit of priority of Japanese Patent Application No. 2005-316415 filed on Oct. 31, 2005, the disclosure of which is incorporated herein by reference.

FIELD OF THE INVENTION

The present invention generally relates to a pressure sensor that detects a pressure of an object being introduced into the pressure sensor from a pressure introduction port.

BACKGROUND OF THE INVENTION

Conventionally, various types of pressure sensors are proposed for detecting a pressure that is introduced to a sensing portion of the sensor from a pressure introduction port. For example, U.S. Pat. No. 5,595,939 discloses a pressure sensor for detecting a pressure of an object. FIG. 4 shows a cross-sectional view of the pressure sensor in the disclosure.

The pressure sensor shown in FIG. 4 is a diaphragm type pressure sensor that has a first case J1 and a second case (i.e., a housing J2) for respectively housing a connector and a pressure introduction portion. That is, the housing J2 is fastened by bending its flange onto the first case J1 having a metal diaphragm J3 interposed therebetween in a concave portion J4 for forming a pressure detection space J5 that houses a sensing element J6 and the like.

The pressure sensing space J5 is sealed by an O ring J7 that is interposed between the first case J1 and the housing J2, and the space J5 is filled with a pressure transfer medium J8 such as an oil or the like. The housing J2 has a pressure introduction hole J9 formed therein, and the hole J9 introduces the object into a subspace J10 that is formed in a horn shape (i.e., having a tapered cross section in an axial direction). The pressure of the introduced object is applied on an opposite side of the metal diaphragm J3 relative to the pressure detection space j5. The pressure of the object is conveyed and applied to the sensor element J6 through the pressure transfer medium J8. In this manner, the sensor element J6 outputs a detection signal to an external circuit through an aluminum wire J11 and a connector terminal J12 for detecting the pressure of the object.

As shown in FIG. 4, the pressure sensor introduces the object into a horn shape space (the subspace J10) for applying the pressure on a broad area of a pressure sensing portion (the metal diaphragm J3). This is because loss of the pressure is reduced when the pressure of the object is applied to a broad surface. In other words, this structure is effective when accuracy of the pressure sensor is in pursuit.

The pressure sensor having the above-described structure works appropriately when, for example, transmission of the pressure of the object introduced from the pressure introduction hole J9 is relatively slow. In this case, the pressure of the object is applied evenly on the metal diaphragm J3 as shown in FIG. 5A.

However, as shown in FIG. 5B, when the pressure of the object from the hole J9 transmits rapidly toward the diaphragm J3, or when increase of the pressure is steep and high in amount, the pressure is first applied to a center portion of the metal diaphragm J3, and then the pressure propagates radially toward a periphery of the diaphragm J3. In other words, there is a time lag between an arrival of the applied pressure at the center of the diaphragm J3 and at the periphery of the diaphragm J3.

Further, as shown in FIG. 5C, when the object is a mixture of gas and liquid or the like, the arrival of the applied pressure is observed at different times respectively at the center and at the periphery of the diaphragm J3 due to the gas and/or the liquid in the pressure introduction hole J9 and/or the subspace J10.

The applied pressure arriving to the pressure sensing portion at different times means that the pressure is unevenly applied on the pressure sensing portion (the surface of the metal diaphragm J3). In addition, when the pressure transmits in a liquid, pressure wave is not easily attenuated, thereby causing a reflected pressure wave that also causes unevenness of the pressure.

The unevenness of the applied pressure on the pressure sensing portion leads to a crack or a breakage of the metal diaphragm J3, or leads to a snapping of the aluminum wire J11 that connects the sensor element J6 and the connector terminal J12.

SUMMARY OF THE INVENTION

In view of the above-described and other problems, the present invention provides a pressure sensor that structurally prevents an unevenness of an applied pressure on a pressure sensing portion.

The pressure sensor of the present invention includes a casing formed with a first case and a second case that has a pressure introduction hole for introducing a measurement object, a pressure sensing portion in the casing, and a metal diaphragm disposed between an end face of the first case and a reception face of the second case. The measurement object is introduced into a subspace that is formed as an expanded end of the pressure introduction hole in the second case for measurement of pressure by transmitting the pressure through the diaphragm to the pressure sensing portion, and the pressure sensing hole has an orifice that reduces a cross-sectional area of the pressure sensing hole. In this manner, the orifice in the pressure introduction hole reduces an inflow of the measurement object, or a liquid, thereby reducing a pressure of the liquid. As a result, the metal diaphragm on the pressure sensing portion is protected from a steep change of the pressure applied thereon. Therefore, the pressure is evenly applied on the pressure sensing portion.

Further, the evenness of the applied pressure prevents a crack or a breakage of the metal diaphragm and/or the snapping of an aluminum wire that couples the sensing portion to an outer circuit. In this case, the diameter of the orifice in the pressure sensor is preferably half the size of the diameter of the pressure introduction hole. The orifice of the above-specified size can reduce the applied pressure effectively, thereby enabling to achieve the effectiveness of the present invention.

Furthermore, the distance from the orifice to the metal diaphragm is preferably equal to or greater than 10 mm. In this manner, a fluid velocity of the measurement object is effectively reduced.

Furthermore, the subspace of the pressure introduction hole has a baffle structure for restraining movement of the measurement object toward the metal diaphragm. In this manner, the movement of the measurement object is restrained, and the applied pressure is evenly distributed on the sensing portion. The baffle structure is also effective for suppressing a reflected wave in the measurement object.

Furthermore, the baffle structure is one of a metal plate having plural holes, a metal net and a woolly metal material for achieving the above described effect.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present invention are described with reference to the drawings. Like parts have like numbers in each of the embodiments.

Figure 1:
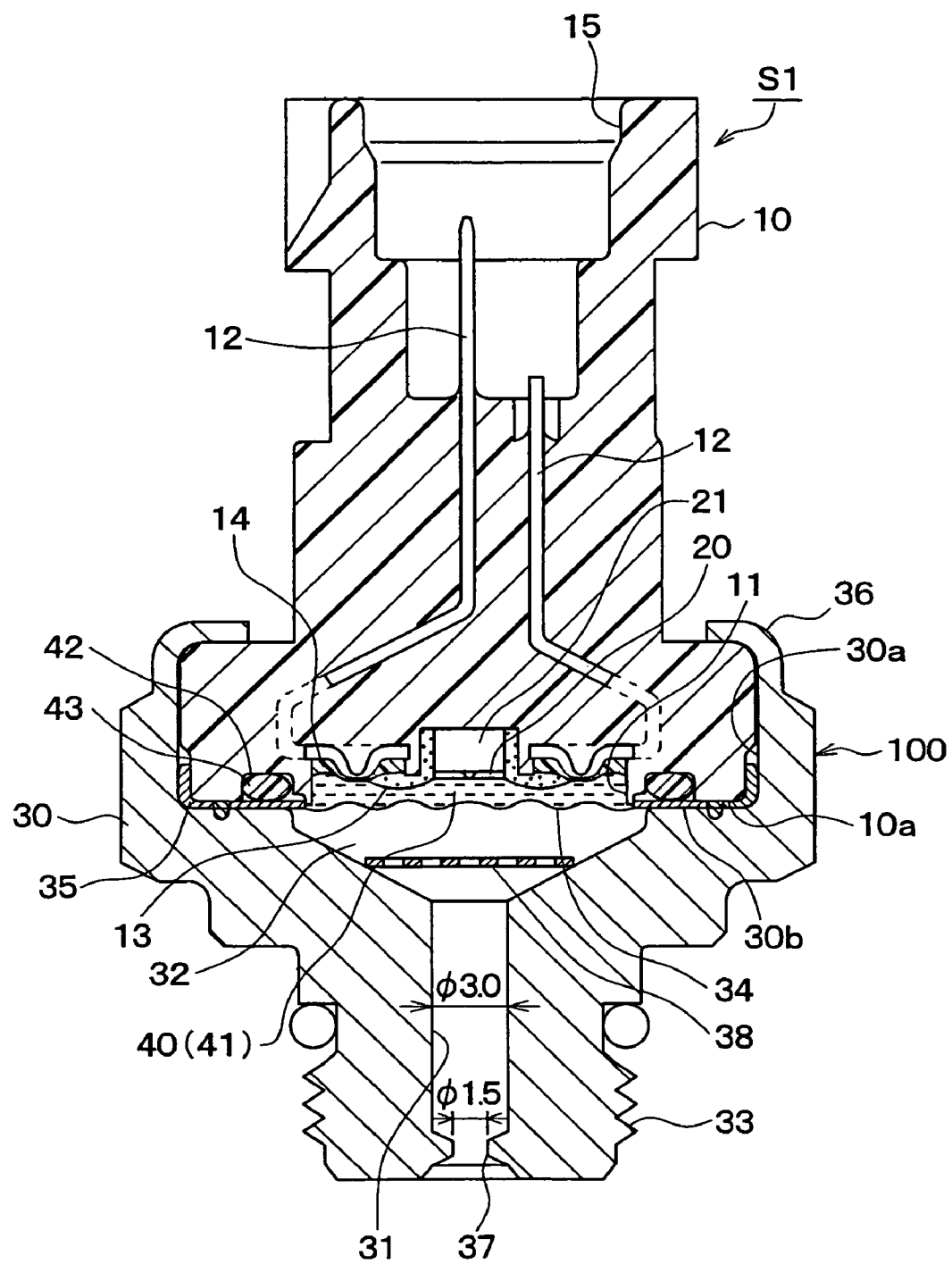
FIG. 1 shows a cross-sectional view of a pressure sensor in an embodiment of the present invention.

A pressure sensor in an embodiment of the present invention is described in the following. FIG. 1 shows a cross-sectional view of the pressure sensor S1. The pressure sensor S1 is used for, for example, detecting a pressure of a coolant in an air-conditioner on a vehicle, a differential pressure of a DPF filter in a diesel engine or similar purposes.

As shown in FIG. 1, a connector case 10 as a first case is formed by using resin such as PPS (Polyphenylene sulfide), PBT (Polybutylene terephthalate) or the like. The connector case 10 is substantially in a columnar shape in the present embodiment. The connector case 10 has a concave portion 11 on one end (a lower side in FIG. 1). The concave portion 11 has a sensor element 20 on a bottom surface.

The sensor element 20 has a diaphragm on its surface for detecting a pressure, and the diaphragm converts a pressure applied thereon to an electric signal by using gauge resistors formed thereon. That is, the sensor element 20 is a semiconductor diaphragm type sensor that outputs an electric signal as a sensor signal in proportion to the applied pressure.

The sensor element 20 is integrally formed with a pedestal 21 made of glass or the like by an anodic bonding. The pedestal 21 is glues on the bottom surface of the concave portion 11. In this manner, the sensor element 20 is disposed in the connector case 10.

The connector case 10 has plural metal terminals 12 in a rod shape for electrically coupling the sensor element 20 with an external circuit or the like. Each of the terminals 12 pierces the connector case 10.

In the present embodiment, the terminal 12 is made of brass having a metal plating such as Ni, and is fixed integrally in the connector case 10 by an insert molding.

Each of the terminals 12 has an end (a lower side in FIG. 1) that protrudes from the bottom surface of the concave portion 11 in a proximity of a sensor element 20 disposition area. The other end (an upper side in FIG. 1) of each of the terminals 12 is exposed in an opening 15 of the connector case 10 on an opposite side relative to the sensor element 20 disposition area.

The one end of the terminal 12 in the concave portion 11 and the sensor element 20 is electrically coupled by a bonding wire 13 made of aluminum, gold or the like.

The terminal 12 has a root portion that protrudes in the concave portion 11. A gap between the root portion of the terminal 12 and the connector case 10 is sealed by a sealant 14 made of silicon resin or the like.

The other end of the connector case 10 (an upper side in FIG. 1) has the opening 15 as shown in FIG. 1. The opening 15 is used as a connector to connect the other end of the terminal 12 to, for example, external wiring such as a wire harness or the like (not shown in the figure) for external connection to an external circuit (ECU or the like). That is, the other end of the terminal 12 in the opening 15 is used for connection to an external circuit. In this manner, the sensor element 20 and the external circuit communicate each other by signals transmitted through the bonding wire 13 and the terminal 12.

The one end of the connector case 10 has a housing 30 fixed thereto as a second case. More practically, the housing 30 has a concave space 30a that houses the one end of the connector case 10. In this manner, the connector case 10 as the first case and the housing 30 as the second case form a casing 100 that houses the sensor element 20.

The housing 30 is made of, for example, metal such as aluminum or the like. The housing 30 has a pressure introduction hole 31 and a subspace 32 that is formed as an expanded end of the hole 31 in a tapered shape (a horn shape). The housing 30 also has a screw portion 33 for fixing a body of the sensor S1 on a coolant pipe or the like. In this manner, the pressure sensor S1 detects a pressure of the measurement object introduced therein. The measurement object is, for example, a coolant in the coolant pipe or the like on an automotive vehicle.

The connector case 10 has an end face 10a abutted to a bottom face 30b of a concave space 30a in the housing 30. The end face 10a and the bottom face 30b bind a metal diaphragm 34 made of a thin metal (e.g., made of SUS:a type of stainless steel) and a ring weld 35 that is also made of metal such as SUS or the like. The bottom face 30b in the housing 30 and the ring weld 35 are welded together for airtight joining. The metal diaphragm 34 and the ring weld 35 are welded together in advance, or at a time of welding the bottom face 30b to metal diaphragm 34 for airtight joining.

The housing 30 has a fastening portion 36 for fastening the connector case 10 on the concave space 30a side. In this manner, the connector case 10 and the housing 30 are fastened integrally to form the pressure sensor S1.

A pressure detection space 40 is formed in the pressure sensor S1. That is, the concave portion 11 of the connector case 10 and the metal diaphragm 34 in the housing 30 define the pressure detection space 40 for detecting the pressure.

The pressure detection space 40 is filled with an oil 41 (e.g., a fluorine oil or the like) that is used as a pressure transmission medium. The oil 41 covers electric connection portion of the sensor element 20, the bonding wire 13 and the like in the concave portion 11. The oil 41 is sealed by the metal diaphragm 34.

The pressure detection space 40 as described above is used to detect the pressure that is applied on the sensor element 20, the bonding wire 13, and the terminal 12 disposed therein after being introduced from the pressure introduction hole 31 through the metal diaphragm 34 and the oil 41.

The end face 10a on the connector case 10 has a groove 42 in a ring shape that surrounds the pressure detection space 40. The groove 42 is used for disposing an O ring 43.

The O ring 43 is made of, for example, a silicon rubber or the like. The O ring 43 is bound in between the connector case 10 and the housing 30. In this manner, the pressure detection space 40 is closed and sealed with the metal diaphragm 34 and the O ring 43.

The pressure sensor S1 in the present embodiment having the above described structure has an orifice 37 in the pressure introduction hole 31 and a baffle structure 38 in the subspace 32.

The orifice 37 is a neck portion of the pressure introduction hole 31 that has a reduced cross-sectional area relative to the other portion of the pressure introduction hole 31. More practically, the diameter of the orifice 37 is equal to or smaller than a half of the diameter of the pressure introduction hole 31. For example, when the diameter of the pressure introduction hole 31 is 3.0, the diameter of the orifice 37 is designed to be equal to or smaller than 1.5. The orifice 37 is positioned at a distance of 10 mm or farther from the metal diaphragm 34.

The baffle structure 38 is an obstacle that prevents a flowing liquid introduced from the pressure introduction hole 31 from directly bumping onto the metal diaphragm 34. For example, the baffle structure 38 may be a metal plate that has plural holes, a metal net, or a steel wool like material for restraining the movement of the flowing liquid. The metal plate or the metal net may be used as a single piece or plural pieces in the subspace 32. The present embodiment shown in FIG. 1 has the baffle structure 38 formed with a piece of metal plate having the plural holes. An outer periphery of the baffle structure 38 is joined with an inner wall of the tapered portion of the subspace 32 in the housing 30 by, for example, welding.

The holes in the baffle structure 38 may not necessarily be smaller than the diameter of the pressure introduction hole 31. That is, for example, a non-perforated portion of the baffle structure 38 may be positioned axially in front of the pressure introduction hole 31 for preventing a direct flow of the flowing liquid toward the metal diaphragm 34.

The pressure sensor S1 is manufactured in the following manner. The connector case 10 having the terminal 12 insert-molded therein is provided, and the sensor element 20 is disposed in the concave portion 11 of the connector case 10 with a silicon adhesive by using the pedestal 21 as a support. Then, the concave portion 11 is carefully filled with the sealant 14 to a certain level so that the sealant 14 does not cover a surface of the sensor element 20. Then, the sealant 14 is hardened. Then, the one end of the terminal 12 and the sensor element 20 are electrically coupled by the bonding wire 13. Then, the concave portion 11 positioned upward is filled with the oil 41.

The baffle structure 38 is disposed in the tapered shape portion of the subspace 32 of the housing 30 and is welded thereto. Then, the metal diaphragm 34 is disposed in the concave space 30a together with the ring weld 35. Then, the metal diaphragm 34 is welded to the housing 30 together with the ring weld 35 that is placed over the metal diaphragm 34.

The housing 30 having the metal diaphragm 34 and the ring weld 35 horizontally held is inserted into the connector case 10 vertically from above of the connector case 10. The housing 30 and the connector case 10 are put in a vacuum chamber to remove an air from the pressure detection space 40. Then, the housing 30 and the connector case 10 are press-fitted to each other so that the end face 10a of the connector case 10 abutted to the bottom face 30b of the housing 30 secures air-tight joint around the pressure detection space 40 along the O ring 43. Then, the fastening portion 36 is fastened to hold the connector case 10 as shown in FIG. 1.

The pressure detection operation of the pressure sensor S1 is described in the following. The pressure sensor S1 is used to detect a pressure of a coolant in a piping of an air-conditioner of the vehicle. The pressure sensor S1 is disposed on the piping by using the screw portion 33 on the housing 30. The pressure introduction hole 31 introduces the pressure of the coolant into an inside of the pressure sensor S1.

The introduced pressure is transmitted to the surface of the sensor element 20 through the oil 41 in the pressure detection space 40 from the metal diaphragm 34. The sensor element 20 outputs the pressure applied thereon as an electrical sensor signal that is proportional to the amount of the pressure. The sensor signal is sent to the external circuit through the bonding wire 13 and the terminal 12 for detecting the pressure of the coolant in the piping.

The orifice 37 disposed in the pressure introduction hole 31 in the present invention restrains the flowing liquid in the pressure introduction hole 31, thereby reducing the pressure of the flowing liquid. Therefore, the metal diaphragm 34 is protected from a steep pressure change caused by the flowing liquid. As a result, an unevenness of the pressure applied to the pressure sensing portion, or the metal diaphragm 34, is prevented, and thus the breakage, the crack and/or the snapping of the metal diaphragm 34 and/or the bonding wire 13 is prevented.

The orifice 37 whose diameter is half the size of the diameter of the pressure introduction hole 31 is effective in terms of reducing the pressure of the measurement object. The effectiveness relative to the size of the orifice 37 diameter is explained with reference to the diagram in FIG. 2.

Figure 2:
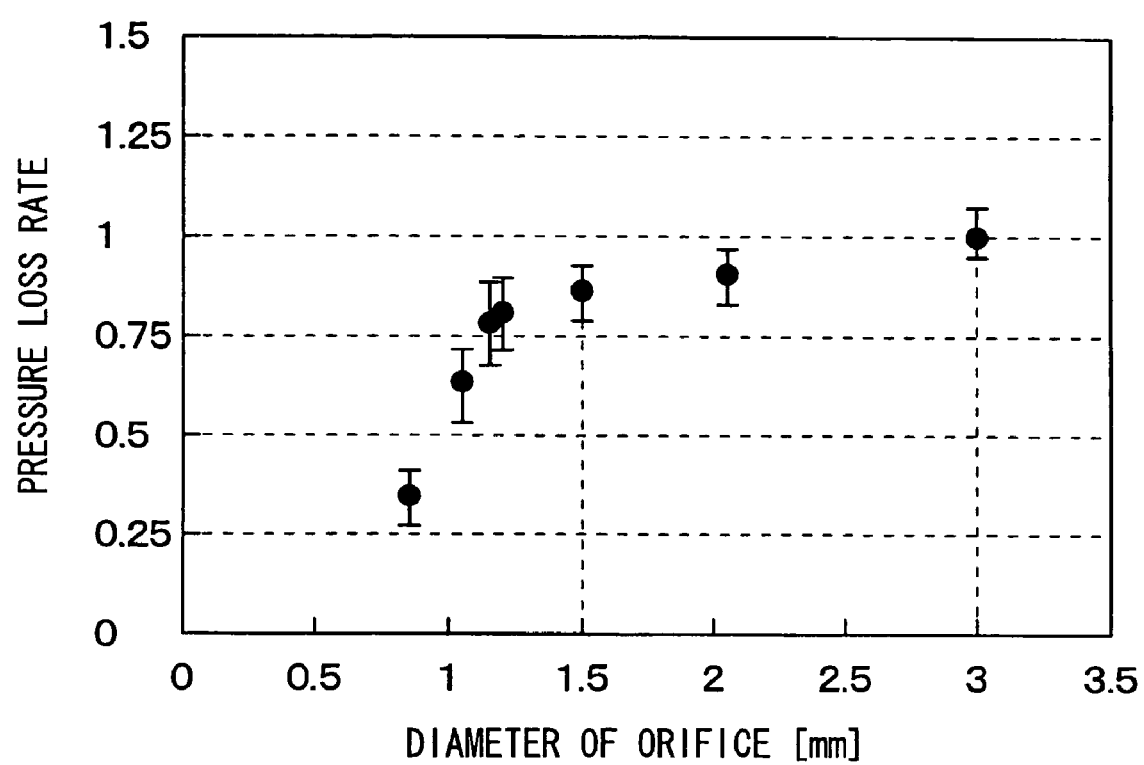
FIG. 2 shows a diagram of a relationship between a pressure loss rate and an orifice diameter.

The diagram in FIG. 2 shows a relationship between a pressure loss rate and a diameter of the orifice 37 in millimeter. The pressure loss rate is calculated as a ratio of the pressure measured with the orifice 37 being disposed in the pressure introduction hole 31 against the pressure measured without the orifice 37.

As shown in FIG. 2, the pressure loss rate being smaller than 1 indicates that pressure concentration at a center portion of the pressure sensing portion is prevented by the orifice 37 disposed in the pressure introduction hole 31. In addition, the smaller the diameter of the orifice 37 is, the higher the pressure loss rate is. That is, when the diameter of the orifice 37 is half the size of the diameter of the pressure introduction hole 31, the reduction degree of the pressure loss rate is increased. Therefore, the effectiveness of the orifice 37 is secured when the diameter of the orifice 37 is half the size of the diameter of the pressure introduction hole 31.

Figure 3:
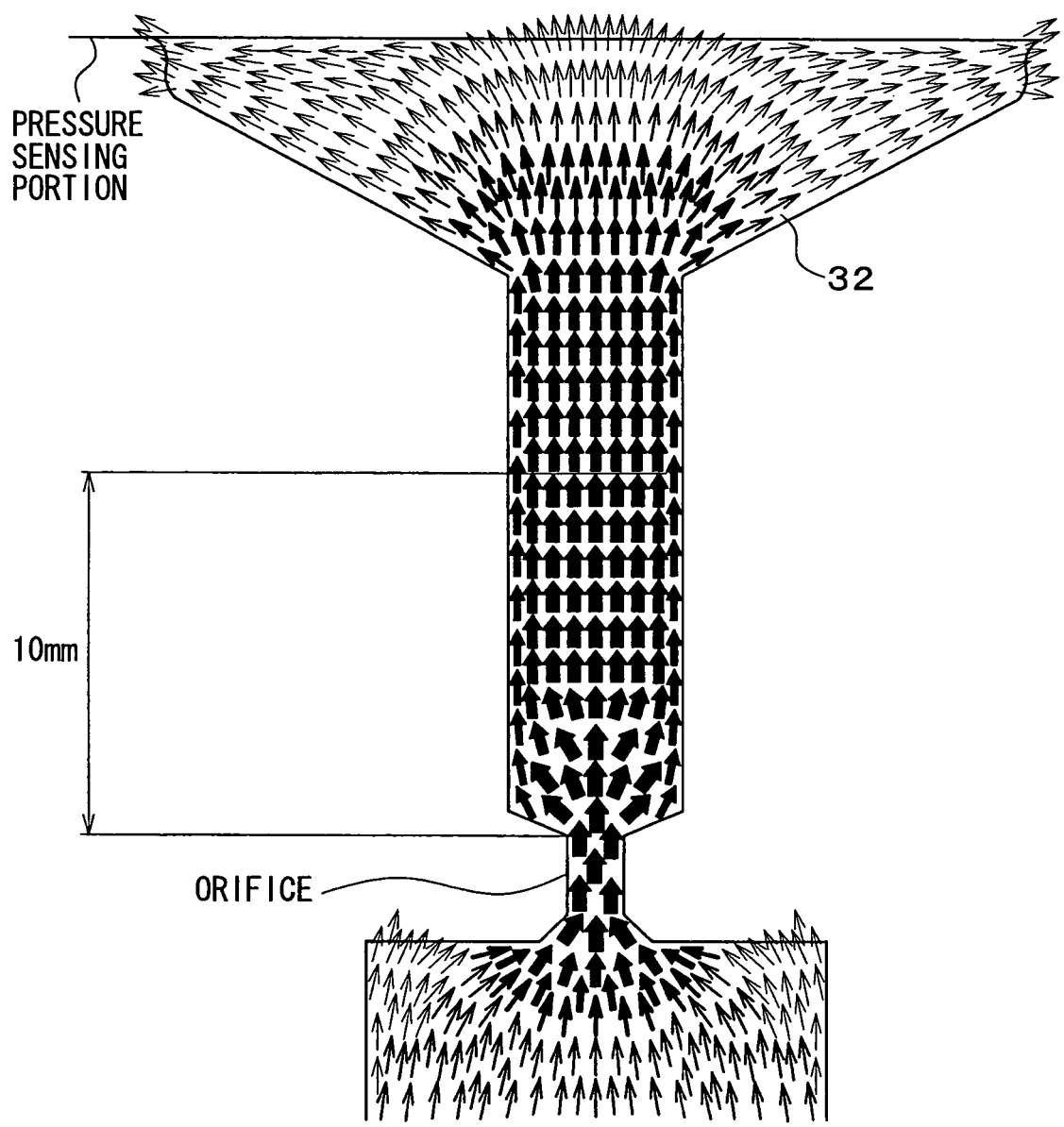
FIG. 3 shows an illustration of a flow velocity relative to a distance from a pressure sensing portion.
Figure 4:
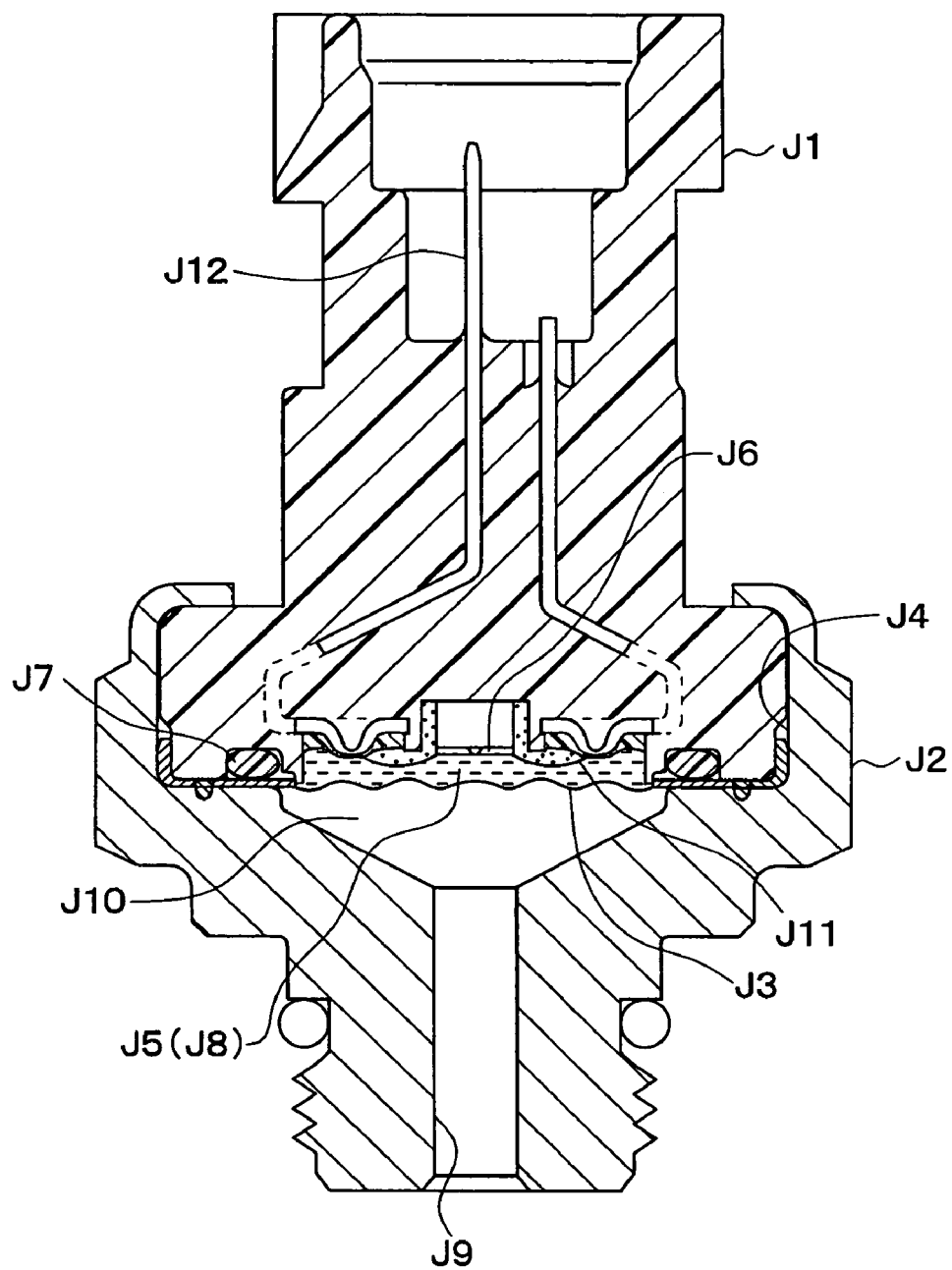
FIG. 4 shows a cross-sectional view of a conventional pressure sensor.
Figure 5A:
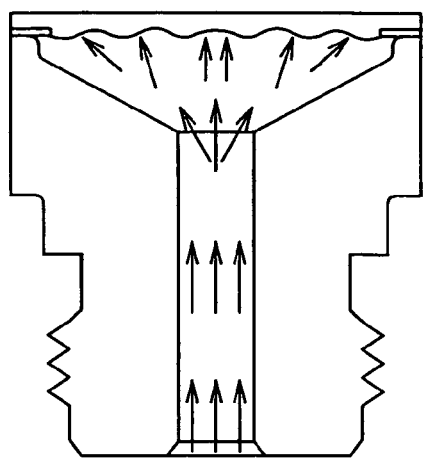
FIGS. 5A to 5C show illustrations of pressure transmission in the conventional pressure sensor.
Figure 5B:
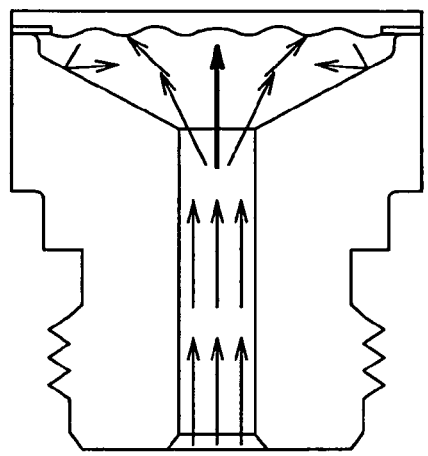
Figure 5C:
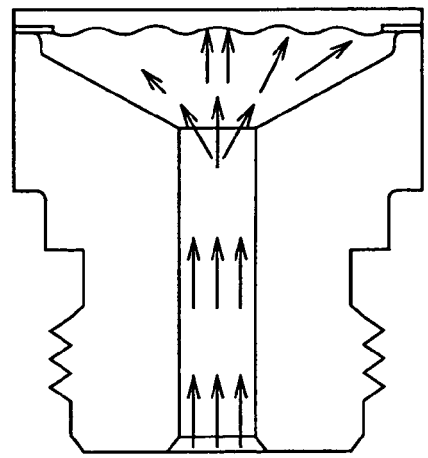

The distance of the orifice 37 from the metal diaphragm 34 is explained in the following. The distance of the orifice 37 from the metal diaphragm 34 is equal to or greater than 10 mm in the present embodiment as shown in FIG. 3. This is because of the flow velocity at an exit from the orifice 37. As shown in FIG. 3, the width of arrows being proportional to the flow velocity is at its maximum at the exit from the orifice 37. Based on the experimental simulation result, a steep reduction of the flow velocity of the flowing liquid in the pressure sensor S1 is observed when the distance of the pressure sensing portion from the orifice 37 is equal to or greater than 10 mm. Therefore, the orifice 37 is preferably positioned at least 10 mm away from the metal diaphragm 34 for effectively reducing the flow velocity of the measurement object.

The pressure sensor in the present embodiment has the baffle structure 38 in addition to the orifice 37. The baffle structure 38 prevents a direct flow of the measurement object from the pressure introduction hole 31 toward the metal diaphragm 34. Therefore, the pressure transmission time is increased, thereby reducing a difference of the pressure transmission time among the different points on the surface of the metal diaphragm 34. Further, the baffle structure 38 restrains the movement of the flowing liquid, thereby enabling suppression of the reflection wave by dispersing the pressure transmission. Therefore, the baffle structure 38 effectively serves for reducing the flow velocity of the measurement object.

Although the present invention has been fully described in connection with the preferred embodiment thereof with reference to the accompanying drawings, it is to be noted that various changes and modifications will become apparent to those skilled in the art.

For example, the orifice 37 and the baffle structure 38 are used in the same structure in the above-described embodiment. However, at least one of the two features effectively reduces the flow velocity of the measurement object, thereby enabling achievement of the above-described effect.

Further, the pressure detection space 40 may not have the oil 41 filled therein. That is, the pressure transmission medium in the pressure detection space 40 may be a gas or the other object.

Furthermore, the connector case 10 and/or the housing 30 may be made of a different material. That is, the connector case 10 may be made of the material different from metal, and/or the housing 30 may be made of the material different from resin.

Furthermore, the sensor element 20 may be an element different from the semiconductor diaphragm type sensor as long as it can convert the pressure applied thereto and can output the sensor signal in proportion to the applied pressure.

Such changes and modifications are to be understood as being within the scope of the present invention as defined by the appended claims.

What is claimed is:

1. A pressure sensor comprising:
   a casing formed with a first case and a second case that has a pressure introduction hole for introducing a measurement object;
   a pressure sensing portion in the casing; and
   a metal diaphragm disposed between an end face of the first case and a reception face of the second case,
   wherein the measurement object is introduced into a subspace that is formed as an expanded end of the pressure introduction hole in the second case for measurement of pressure by transmitting the pressure through the diaphragm to the pressure sensing portion, and
   the pressure introduction hole has an orifice that reduces a cross-sectional area of the pressure introduction hole.

2. The pressure sensor as in claim 1,
   wherein the pressure introduction hole and the orifice has a round cross section, and
   a diameter of the orifice is half a size of the diameter of the pressure introduction hole.

3. The pressure sensor as in claim 1,
   wherein a distance from the orifice to the metal diaphragm is at least 10 mm.

4. The pressure sensor as in claim 1,
   wherein the subspace has a baffle structure for restraining movement of the measurement object toward the metal diaphragm.

5. The pressure sensor as in claim 4,
   wherein the baffle structure is made of one of a metal plate having plural holes, a metal net and a woolly metal material.

6. A pressure sensor comprising:
   a casing formed with a first case and a second case that has a pressure introduction hole for introducing a measurement object;
   a pressure sensing portion in the casing; and
   a metal diaphragm disposed between an end face of the first case and a reception face of the second case,
   wherein the measurement object is introduced into a subspace that is formed as an expanded end of the pressure introduction hole in the second case for measurement of pressure by transmitting the pressure through the diaphragm to the pressure sensing portion, and
   the subspace has a baffle structure for restraining movement of the measurement object toward the metal diaphragm.

7. The pressure sensor as in claim 6,
   wherein the baffle structure is made of one of a metal plate having plural holes, a metal net and a woolly metal material.

* * * * *